United States Patent
Supriya (10) Patent No.: US 10,644,536 B2
(45) Date of Patent: May 5, 2020

(54) COOLING SYSTEMS AND METHODS FOR AUTOMATIC TRANSFER SWITCH

(71) Applicant: Cummins Power Generation IP, Inc., Minneapolis, MN (US)

(72) Inventor: Amrit Supriya, Minneapolis, MN (US)

(73) Assignee: Cummins Power Generation IP, Inc., Minneapolis, MN (US)

(*) Notice: Subject to any disclaimer, the term of this patent is extended or adjusted under 35 U.S.C. 154(b) by 185 days.

(21) Appl. No.: 15/824,815

(22) Filed: Nov. 28, 2017

(65) Prior Publication Data

US 2019/0165601 A1 May 30, 2019

(51) Int. Cl.
| | | |
|---|---|---|
| *H02J 9/06* | (2006.01) | |
| *H01H 3/02* | (2006.01) | |
| *H01H 9/52* | (2006.01) | |
| *H01H 9/40* | (2006.01) | |

(52) U.S. Cl.
CPC ................ *H02J 9/06* (2013.01); *H01H 3/02* (2013.01); *H01H 9/52* (2013.01); *H01H 9/40* (2013.01); *H01H 2300/018* (2013.01)

(58) Field of Classification Search
CPC ....... H02J 9/06; H01H 3/02; H01H 2300/018; H01H 9/40; H01H 9/52
See application file for complete search history.

(56) References Cited

U.S. PATENT DOCUMENTS

| | | | |
|---|---|---|---|
| 4,363,975 A | 12/1982 | Beattie | |
| 4,513,274 A | 4/1985 | Halder | |
| 6,028,422 A | 2/2000 | Preusse | |
| 6,097,108 A | 8/2000 | Tweed | |
| 6,163,087 A * | 12/2000 | Huang | G06F 1/20 307/64 |
| 6,392,372 B1 * | 5/2002 | Mays, II | H02P 6/08 318/400.01 |
| 7,102,478 B2 | 9/2006 | Pridmore et al. | |
| 7,508,157 B1 | 3/2009 | Gabrys | |
| 2007/0109088 A1 | 5/2007 | Askildsen et al. | |
| 2015/0244220 A1 * | 8/2015 | Yost | H02K 1/2793 310/156.12 |
| 2017/0005510 A1 * | 1/2017 | Rohr | H02J 9/061 |
| 2017/0117104 A1 * | 4/2017 | Zhou | H01H 3/28 |
| 2017/0117747 A1 * | 4/2017 | Zhou | H01H 3/28 |

FOREIGN PATENT DOCUMENTS

WO  WO-2015/080693  6/2015

* cited by examiner

*Primary Examiner* — Jared Fureman
*Assistant Examiner* — Duc M Pham
(74) *Attorney, Agent, or Firm* — Foley & Lardner LLP (57) ABSTRACT

An assembly includes an automatic transfer switch having an operating mechanism. The operating mechanism is configured to cause current to flow through the automatic transfer switch. The assembly further includes a cooler configured to cool at least a portion of the automatic transfer switch. The cooler is structured to be wirelessly driven by electromagnetic fields generated in response to current flowing through the automatic transfer switch.

24 Claims, 12 Drawing Sheets

COOLING SYSTEMS AND METHODS FOR AUTOMATIC TRANSFER SWITCH

TECHNICAL FIELD

The present disclosure relates generally to the field of automatic transfer switches. More particularly, the present disclosure relates to methods and devices involving managing the thermal environment of such switches.

BACKGROUND

Automatic transfer switches (ATS) have a wide range of components and configurations, generally allowing loads to be switched multiple power sources or power grids. A representative ATS may include multiple phases which are typically physically mounted in an ATS side-by-side, e.g., in a linear arrangement of Phase A, Phase B and Phase C. Such an ATS is typically capable of carrying high currents, resulting in heat generation which is dissipated in the surrounding environment. This high temperature on current carrying components and surrounding environment affects the longevity and reliability of the ATS. By lowering the overall temperature, long term thermal protection for the ATS may be achieved, which helps to increase the reliability and longevity of the ATS.

SUMMARY

One embodiment of the present disclosure relates to an assembly including an automatic transfer switch having an operating mechanism configured to cause current to flow through the automatic transfer switch. The assembly additionally includes a cooler which is configured to cool at least a portion of the automatic transfer switch and structured to be wirelessly driven by electromagnetic fields generated in response to current flowing through the automatic transfer switch.

Another embodiment of the present disclosure relates to a system including an automatic transfer switch comprising a plurality of switch components comprising respective pluralities of cassettes, and at least one conductor configured to generate a magnetic field in response to current flowing through the conductor. The system further includes a permanent magnet and a driven shaft driven by rotation of the permanent magnet in the magnetic field. A polarity of the magnetic field changes in accordance with an alternating current of the automatic transfer switch.

Still another embodiment of the present disclosure relates to a method comprising disposing at least an automatic transfer switch and a cooler in an enclosure, generating a magnetic field by supplying alternating current to at least one conductor in the automatic transfer switch, disposing a driving mechanism in the magnetic field, and driving the cooler by rotation of the driving mechanism in response to the magnetic field.

Yet another embodiment relates to an automatic transfer switch cooling apparatus that includes an automatic transfer switch including an operating mechanism configured to cause current to flow through the automatic transfer switch. The automatic transfer switch cooling apparatus further comprises an electromagnetic coupling device that is located proximal to a conductor or a transfer switch of the automatic transfer switch. The electromagnetic coupling device is configured to generate electrical power from electromagnetic fields generated by electrical current flowing in the conductor or the transfer switch. The automatic transfer switch cooling apparatus further comprises one or more cooling fans coupled to electromagnetic coupling device. The one or more cooling fans are configured to cool at least a portion of the automatic transfer switch and structured to be driven by electrical power from the electromagnetic coupling device generated from electromagnetic fields generated in response to current flowing through the automatic transfer switch.

BRIEF DESCRIPTION OF THE FIGURES

The foregoing and other features of the present disclosure will become more fully apparent from the following description and appended claims, taken in conjunction with the accompanying drawings, in which:

In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to apparatuses and methods for automatic transfer switching. Certain embodiments described herein relate generally to three-phase ATS devices having phases which are physically mounted side-by-side, e.g., in a linear arrangement in order of phase A, phase B and phase C. Electromagnetic cross coupling, induced eddy currents in ATS components, and internal impedance in electrical components and buses. may contribute to parasitic losses and may increase heat in the system, so as to induce temperature increases of up to 10° C. Cooling may be needed to ensure that the ATS complies with applicable technical specifications and/or requirements, such as those set forth by Underwriters Laboratories, for example. Cooling may be needed to avoid de-rating of the ATS. According to at least one embodiment, at least one cooling system is provided which is powered parasitically by the ATS, controlling the internal and environmental temperature.

Referring to the figures generally, the various embodiments disclosed herein relate to cooling systems for ATS devices. Certain embodiments relate to cooling systems which employ wireless technology to power cooling components for high amperage rated transfer switches. Specifically, the cooling systems cool the ATS and transformer devices and therefore beneficially increase the life times and reliability of such systems.

ATS devices, if kept at high heat for long periods of time, are prone to reliability problems including electromechanical failures. By regulating the environmental temperature, the cooling system of at least one exemplary embodiment decreases the risk of such failures. In particular, certain embodiments achieve both higher reliability and longer lifetimes due to the reduction in temperature realized by providing a cooling system as discussed below.

By reducing the overall temperature, long term thermal protection for the ATS may be achieved, which helps to increase the reliability and longevity of the ATS. In particular, decreasing the operating temperature by about 12.2° C. or (10° F.) of a cassette in an ATS application may approximately double the lifespan of a cassette. Thus, improving the cooling of selected components or the ATS as a whole can improve the system lifespan and helps to satisfy applicable electrical code and/or UL guidelines. It is noted that by lowering the general operating temperature of the ATS or a specific component therein for a given current flow at ambient conditions as described above, the effective maximum total current which can be carried by an ATS before de-rating may be effectively increased. Further still, the cooling systems may reduce humidity as well as temperature within an enclosure in which the ATS is positioned. The resulting decrease in both temperature and humidity enhances the reliability and lifetime of the ATS.

Moreover, certain embodiments described herein advantageously provide for cooling utilizing power flowing through the ATS, without requiring a separate power source for the cooling system. Such embodiments have numerous benefits. In particular, by avoiding the need for a separate local power source and supporting wiring and setup, exemplary cooling systems may be designed with fewer and less complex components and may also attain lower energy consumption, for example. Further, assembly and maintenance can be carried out more easily due to the more streamlined design of such embodiments and ease of electrical isolation for inspection and maintenance, which also take up less space in the enclosure.

As discussed in more detail below, various embodiments of the present disclosure relate to cooling systems and cooling methods in which an automatic transfer switch and a cooler are provided in an enclosure. According to such systems and methods, a magnetic field is generated due to flow of current to at least one conductor in the automatic transfer switch. A driving mechanism is placed in the magnetic field, and the cooler is driven by rotation of the driving mechanism in response to the electromagnetic induction. Such techniques allow for a separate dedicated local power source for the cooling system to be omitted, among other advantages.

Figure 1:
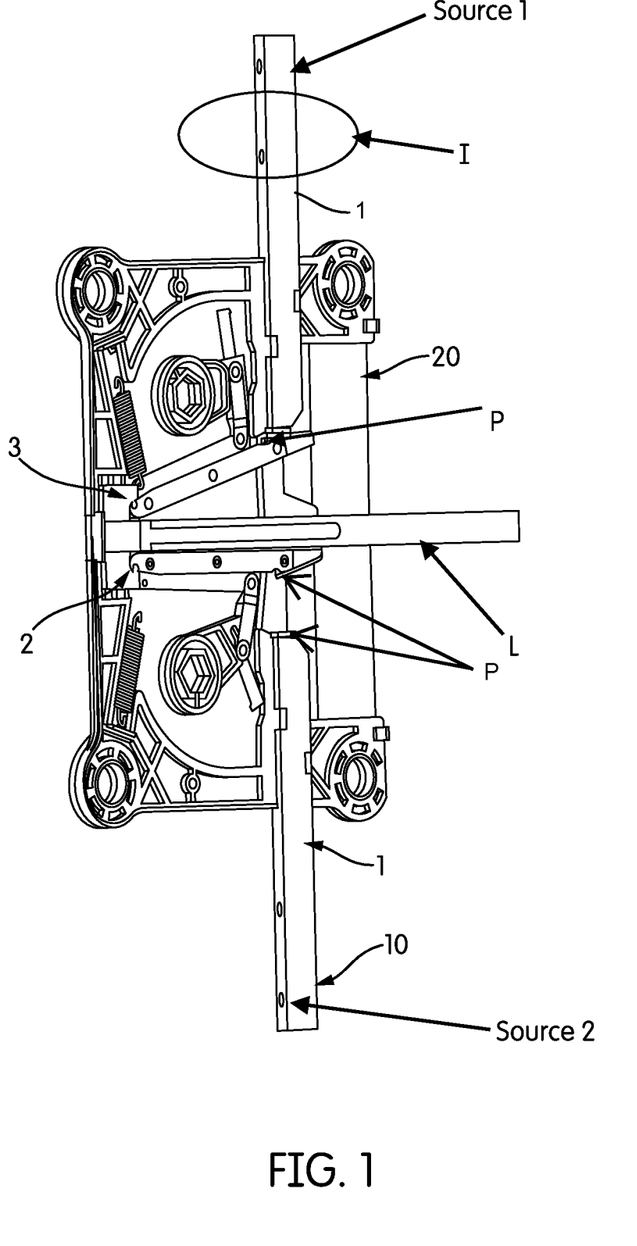
FIG. 1 depicts a cross-sectional view of a cassette assembly of an ATS according to an embodiment.

FIG. 1 depicts components of an ATS according to an embodiment. A switching member 10 is connected to a first source (Source 1) and disconnected from a second source (Source 2), and comprises a pair of stationary components 1, a pair of movable components 2 (also called a 'movable tip), and a T-bus component 3, which may be also referred to as a T-joint, where a load L is distributed. The switching member 10 is configured to carry current, so as to cause current to be distributed in an ATS. The location at which a terminal end of the movable component 2 is closest to stationary component 1 is a point P, where the movable and stationary contacts of each finger/moveable component (source 1, source 2) come together, is generally the point of highest resistance, as shown in FIG. 1.

A secondary, but lesser, source of resistance impedance in each cassette is at the meeting of the movable components and the T-joint. FIG. 1 depicts the switching member 10 arranged with a single cassette 20 in a single cassette assembly (in a non-sectional view). The cassette 20 comprises a non-conducting part. As shown in FIG. 1, current I flows through one 'finger' of the assembly (e.g., the stationary component 1) and/or through the cassette 20. For example, current may flow at a 'finger' portion which is circled in FIG. 1, in addition to other portions of the switching member and/or cassette, and generate heat from the impedance of the cassette and in the bus conductors, as well as via electromagnetic coupling induced by the current in metal components of the ATS.

Figure 2:
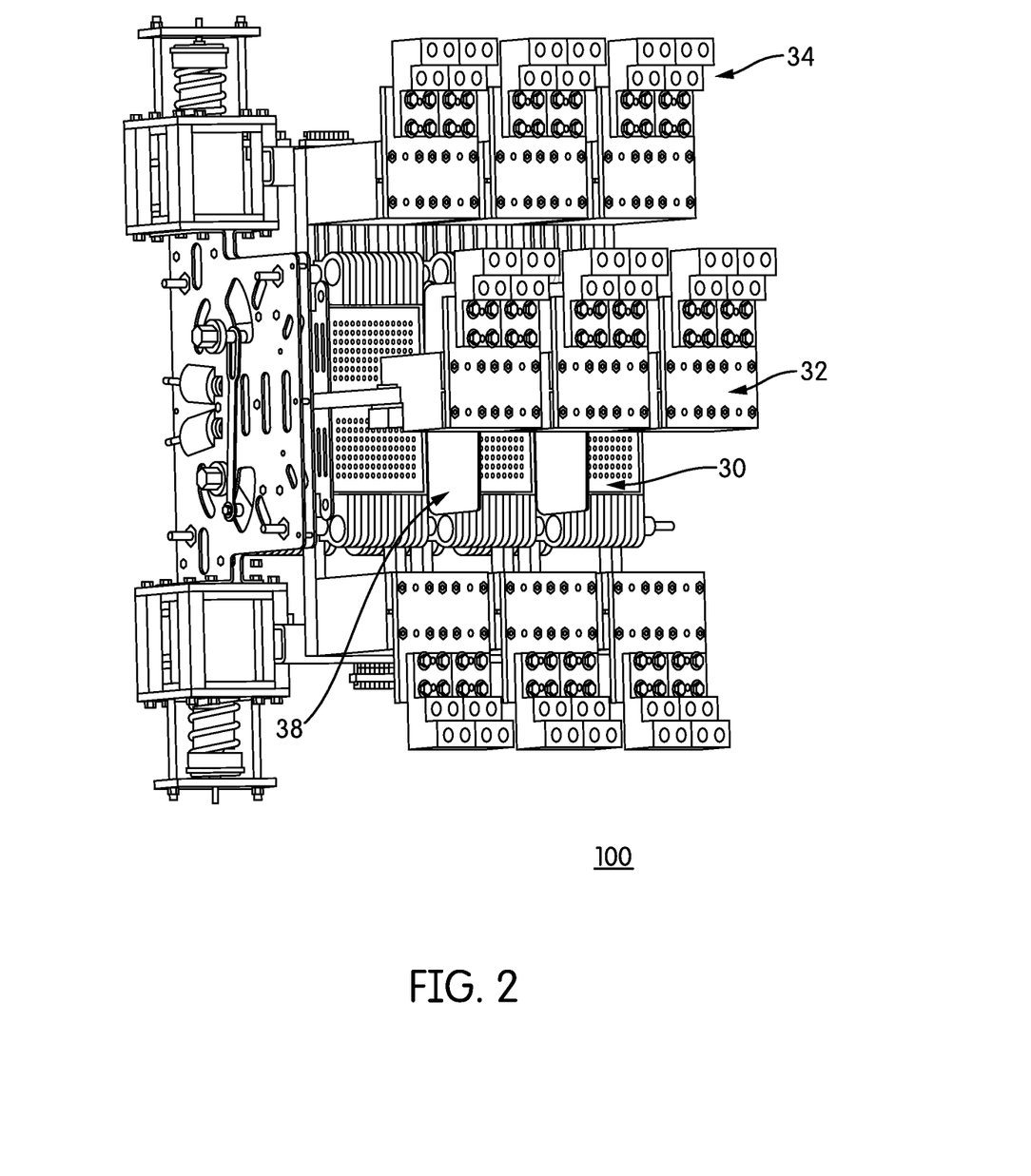
FIG. 2 depicts a portion of an ATS according to an embodiment.

FIG. 2 depicts a portion of a 3-phase ATS assembly 100 where each phase of the three phase assembly is provided with a cassette sub assembly 30 comprising a plurality of cassettes. Buses 34 and lugs 32 are shown in an exemplary arrangement, although it should be noted that a wide variety of ATS configurations may be employed with the bus 34 and lugs 32 in various locations, and that the ATS may still further include additional components to carry out actuation and driving of particular systems and/or components. Such configurations may be cooled according to certain exemplary embodiments described in more detail below. In such embodiments, an electromagnetic field is generated by supplying current to at least one conductor in the ATS. A driving mechanism is placed in the magnetic field, and a cooler is driven by rotation of the driving mechanism in response to electromagnetic induction.

Figure 3:
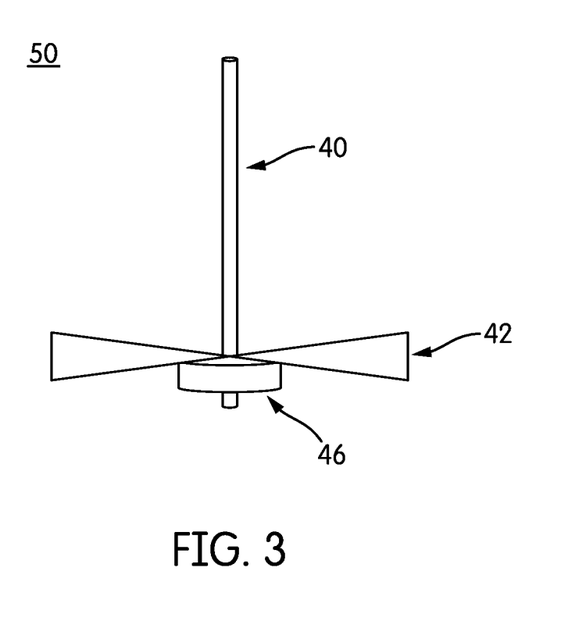
FIG. 3 depicts an exemplary cooling system according to an embodiment.

Turning now to FIG. 3, FIG. 3 depicts an exemplary cooling system 50 according to an embodiment. The cooling system 50 according to certain embodiments may be provided with an ATS such as ATS 100, to allow for energy-efficient cooling of ATS 100. The exemplary cooling system 50 includes a shaft 40 connected to blades 42. Blades 42 are arranged with respect to shaft 40 so as to rotate with the shaft 42. For example, the blades may be concentrically arranged around shaft 40. A permanent magnet 46 is disposed toward one end of shaft 40, i.e., a first end, which is closer to the blades 42 than a second end of shaft 40. The permanent magnet 46 is larger in diameter than the shaft 40 but is smaller in diameter than a length of one of the blades 42, in the illustrated embodiment. The blades 42 and shaft 40 may be disposed in a housing.

The cooling system 50 is configured as a wireless fan. The wireless fan harnesses the magnetic field generated by current flowing through the ATS 100 itself without any external power requirement to drive the fan. Alternating current (e.g., a loop of alternating current, as discussed below) generates a strong magnetic field in the ATS 100. The permanent magnet 46, because it is placed in the magnetic field, experiences the effects of the magnetic field, which is exerted as a force, and starts rotating without any external excitation according to Faraday's law.

The polarity of the magnetic field changes every half cycle due to the alternating nature of current. A permanent magnet placed in this field will always be attracted towards the opposite pole and therefore will rotate. Such rotation may then be used to drive a fan or another device. For example, the rotation may be used to drive a fan to create an artificial cooling air convection within or venting to outside from inside an enclosure (e.g., a cabinet where ATS 100 is located), so as to reduce the temperature rise of the ATS 100 and to therefore beneficially extend the long term reliability and life time of the ATS 100. In this manner, the cooler 50 operates unpowered, i.e., without a physical connection to an external power supply, according to certain embodiments. Additionally, the rotational energy can be utilized to drive any component requiring a rotational force or to generate energy in certain embodiments, for example a pump in liquid cooled applications (such as within oil filled transformers).

As mentioned above, in the illustrated embodiment, the cooling system 50 includes a permanent magnet 46. The permanent magnet 46 is configured to rotate in response the aforementioned electromagnetic fields. In some embodiments, the permanent magnet 46 is a "super magnet" which typically includes or is formed of rare earth metals that have strong magnetism and are therefore highly responsive to the magnetic fields. In at least one embodiment, the permanent magnet 46 is a neodymium magnet. In some such embodiments, the neodymium magnet has twelve poles. The permanent magnet 46 acts as a driving mechanism which drives the drive shaft 40 in response to the magnetic field.

Figure 4A:
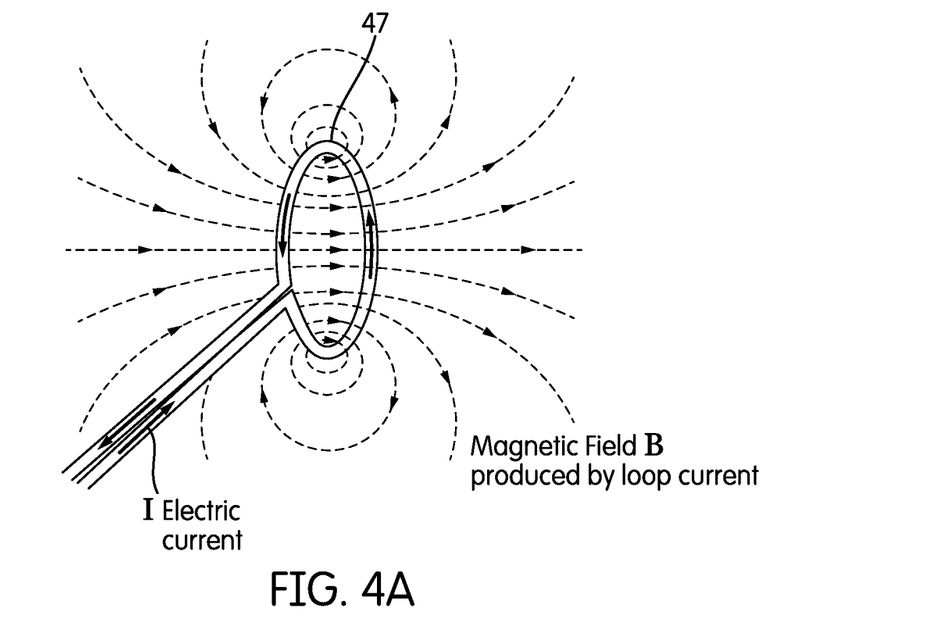
FIG. 4A depicts a typical induced electromagnetic field generated around a current carrying conductor loop.

FIG. 4A depicts a typical electromagnetic field induced in a current carrying loop conductor 47. As seen in FIG. 4A, current (depicted with arrows on the loop itself) travels counterclockwise in a loop around the conductor 47. A magnetic field B is produced by the loop current. The magnetic field is significantly stronger in the center of the loop than outside the loop. The magnetic field generated due to the current carrying conductor loop in the ATS is comparable to the exemplary set up shown in FIGS. 4C and 4D. In the set-up shown in FIGS. 4C and 4D, the permanent magnet 46 is disposed in the induced magnetic field generated by conductor 47. Here, the electromagnetic energy is directly converted into mechanical energy that can drive a shaft of a cooler 50, discussed below in more detail.

Figure 4B:
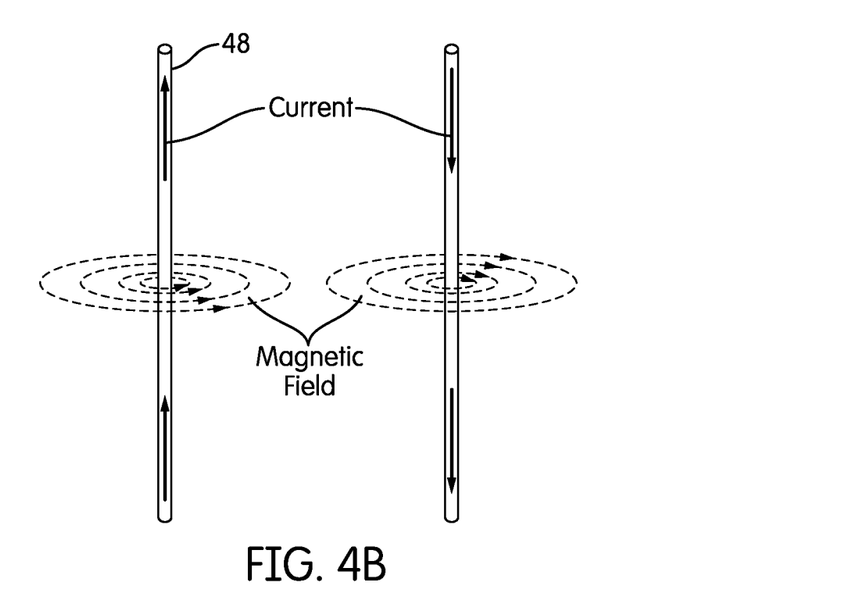
FIG. 4B depicts a typical induced electromagnetic field generated around a straight current carrying conductor.
Figure 4C:
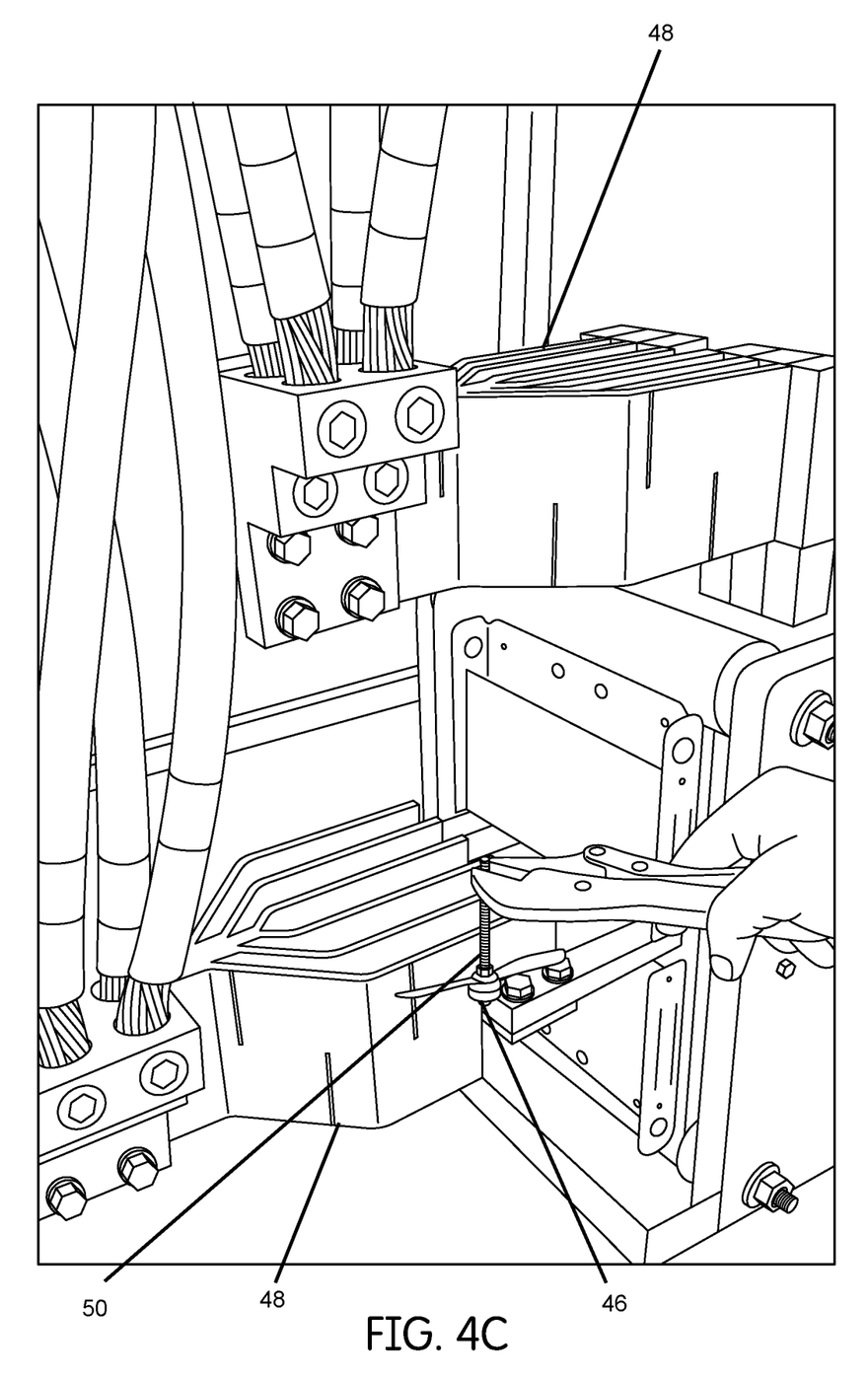
FIG. 4C depicts an exemplary configuration of an ATS system with a current carrying conductor loop, according to an embodiment.
Figure 4D:
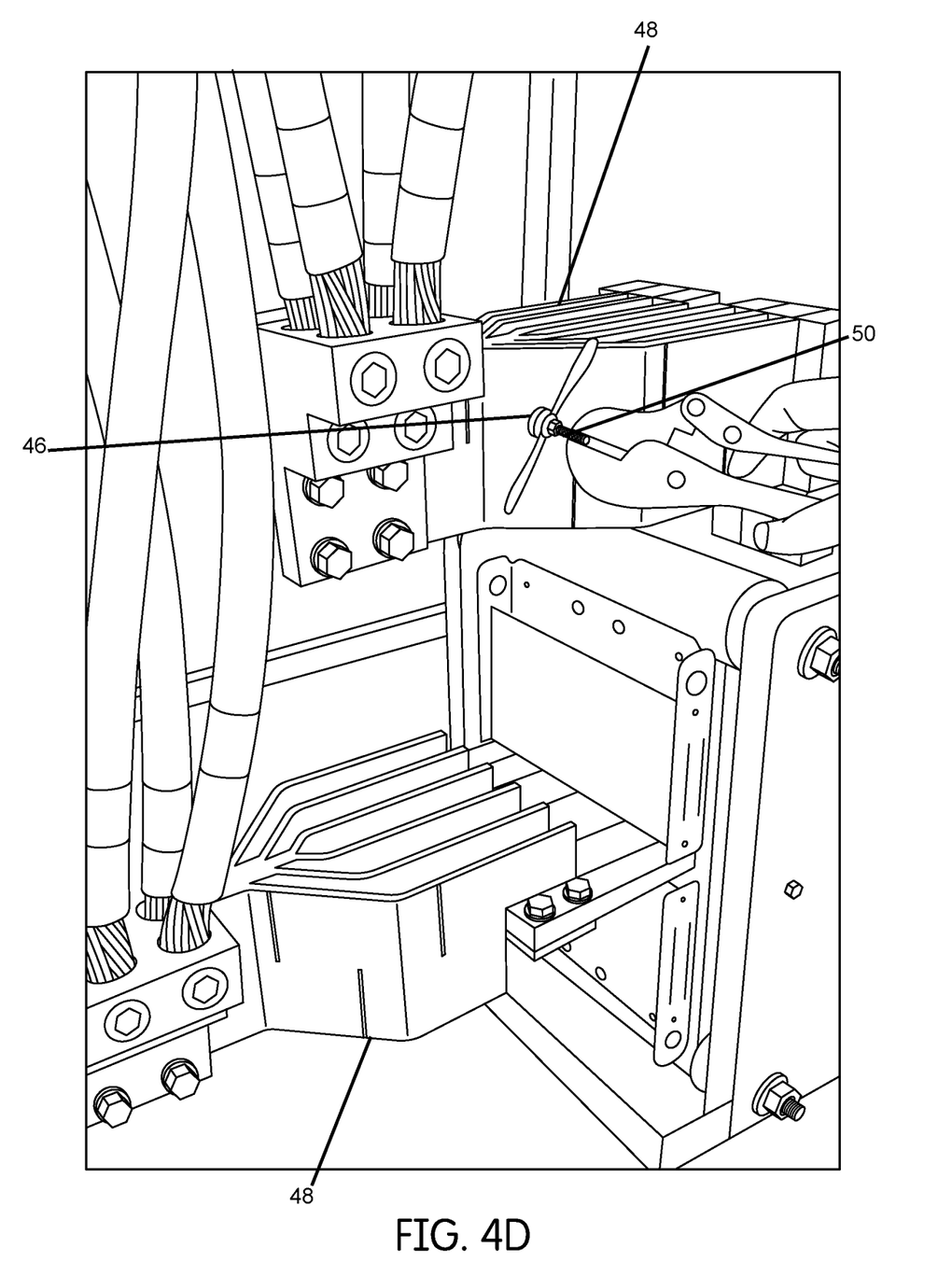
FIG. 4D depicts an exemplary configuration of an ATS system with a straight carrying conductor, according to an embodiment.

FIG. 4B depicts a typical electromagnetic field induced in a current carrying straight conductor 48. Additionally, FIG. 4B shows the change in direction of the induced magnetic field due to reversal of direction of the alternating current conducting through the conductor. The magnetic field generated due to the straight current carrying conductor in the ATS is comparable to the exemplary set up shown in FIGS. 4C and 4D. As shown in FIGS. 4C and 4D, the magnet 46 is disposed in the induced magnetic field generated by the conductor 48.

Here as well, the electromagnetic energy is directly converted into mechanical energy that can drive a shaft of a cooler 50. It is noted that in FIGS. 4C and 4D that the cooler 50 can be enclosed and permanently mounted in specific locations designed to maximize the cooling air flow through the ATS or focus and impinge air flow on or through selected components to cool them. It is further noted that the cooler 50 can be ducted or packaged for convenience of mounting or enhancement of operation, such as by ducting or matching driving the mechanical force to the fan size.

In at least one additional embodiment, the electromagnetic field energy induced by current flowing through an ATS can be harnessed to drive any DC or AC loads, e.g., a cooling device, a lighting device, or a sensing device, or combinations of the foregoing, by converting the electromagnetic energy into AC or DC electrical energy using the transformer action of the electromagnetic fields on a proximately placed transformer or solenoid coupled to an optional rectifier and/or power conditioning circuitry. It is noted that such derived AC or DC power is electrically isolated from the current flowing in the ATS and yet is unpowered when the ATS is disconnected for maintenance from the power mains (unless a battery or other electrical energy storage is used in the powered circuit). The generated power can also be altered in voltage or current flow to better match the application by altering the number of turns in the solenoid, coil, or transformer. It is further noted that power generated in this manner by use of a solenoid, coil, or transformer can allow for the cooling fan or other powered device to be remotely placed within or exterior to the ATS and does not have to be placed proximate to the current carrying conductors and their electromagnetic fields.

Figure 5A:
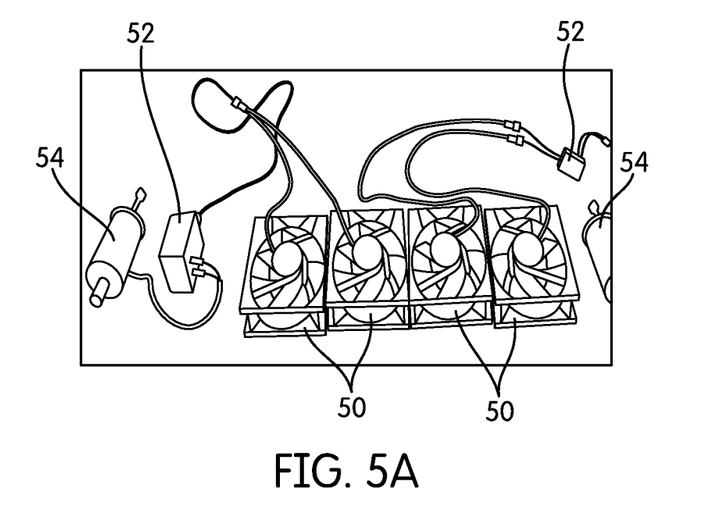
FIG. 5A depicts an exemplary cooling system arrangement according to an embodiment.

FIG. 5A depicts an exemplary cooling system arrangement according to an embodiment. The exemplary cooling system arrangement includes a plurality of coolers or cooling units 50 arranged adjacent (in parallel) to each other. While the coolers 50 shown in FIG. 5A are substantially uniform in size to each other, it should be understood that in some embodiments, a single cooling system may contain fans coolers of different sizes and shapes, and that such coolers need not be adjacent to each other. The cooler may be placed at multiple positions inside and outside the current loop within the ATS enclosure to achieve the desired temperature reduction outcome.

In at least one embodiment, the exemplary coolers 50 shown in FIG. 5A are DC fans. The electromotive force (EMF) is induced in solenoid coil 54 by current flowing through the ATS. An AC-DC adapter/filter 52 connected to the solenoid is used to convert the AC current into DC current that drives the DC fans 50. In at least one embodiment, a transformer coupled to one or more of the phase busses can be used to harness the electromagnetic energy instead of a solenoid coil or other electromagnetic coupling device.

On the other hand, in some embodiments, an AC fan may be used. The AC fan can be driven by an electromagnetic device structured to convert magnetic fields generated by current flowing through the bus conductors and cassettes of the ATS into AC current (e.g., solenoid 54, or a transformer). The fan may be driven directly off the coil 54, or an intervening AC-AC converter or filter may be used to convert the current to device-specific requirements. Thus, in such embodiments, the AC and DC fans may be driven using the electromagnetic fields energy. In other words, such mechanisms are similar in some respects to the permanent magnet implementations described above, but provide for electrical, rather than magnetic, capturing of the field energy.

It should be appreciated that some embodiments do not employ a cooling device such as a fan as described above. For example, in at least one embodiment, the electromagnetic field energy induced by current flowing through an ATS can be harnessed to drive any DC or AC loads, e.g. a cooling device, controls, a lighting device, or a sensing device, or combinations of the foregoing, by converting the electromagnetic energy into electrical energy using a transformer or a solenoid.

Figure 5B:
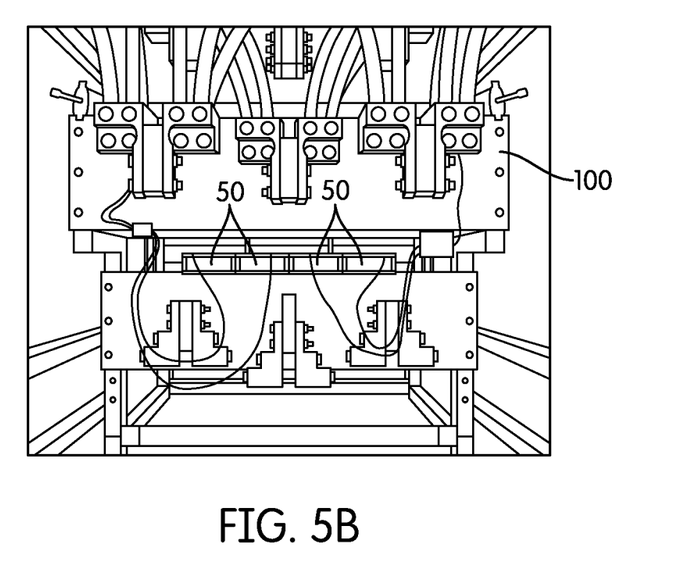
FIG. 5B depicts an exemplary apparatus according to an embodiment.
Figure 5C:
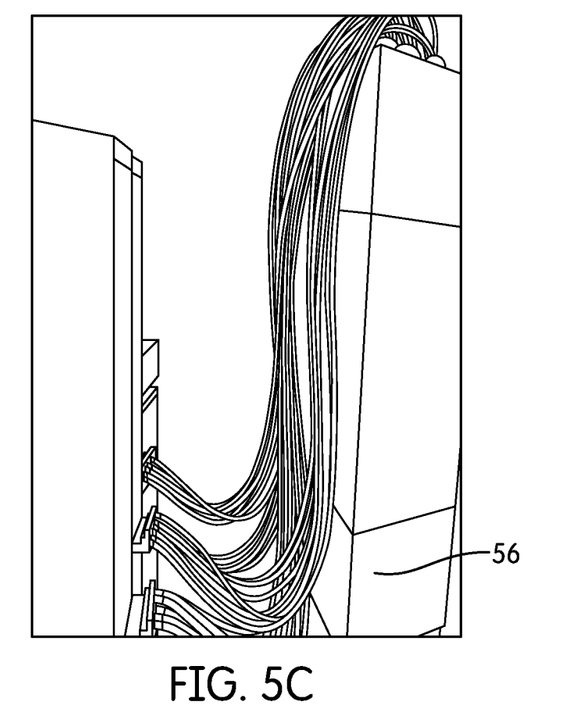
FIG. 5C depicts an enclosure in which the apparatus of FIG. 5B is disposed according to an embodiment.
Figure 5D:
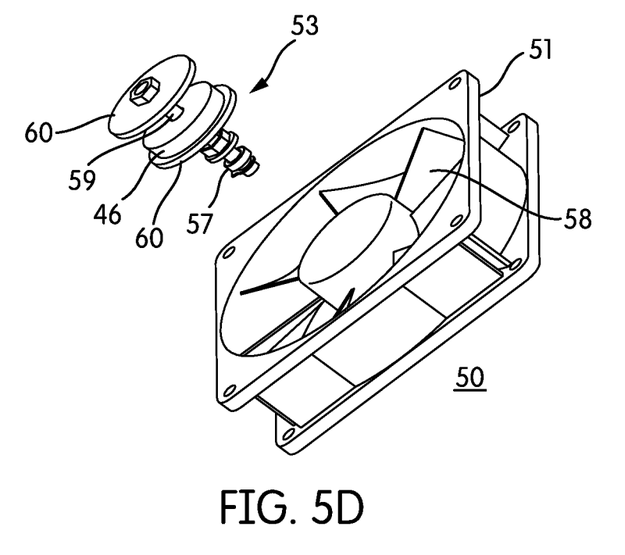
FIG. 5D depicts an exploded view of an exemplary configuration of a cooler.

FIG. 5D depicts an exploded view of a cooler according to an exemplary embodiment. The cooler 50 comprises a fan casing assembly having a casing 51 with fan blades 58 disposed therein. A fan mount assembly 53 is mounted inside the casing 51. The fan mount assembly 53 comprises a pair of end plates 60 between which a permanent magnet 46 is located. For example, in at least one embodiment, a pair of end plates 60 sandwiches magnet 46 between the plates 60.

Figure 5E:
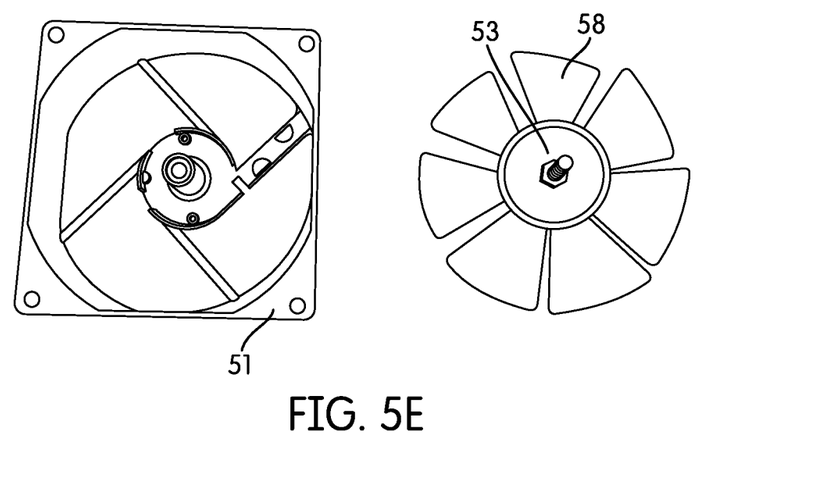
FIG. 5E depicts components of a cooler according to an exemplary embodiment.

Additional components, such as bearing shaft stud 59, may be positioned between the permanent magnet 46 and the end plates 60. For example, the stud 59 may be placed atop the permanent magnet 46 so as to be disposed between the magnet 46 and one of the end plates 60 that is closer to the top surface of the magnet 46 than to a bottom surface of the magnet 46. Further, a ball bearing 57 is positioned lower than a lower surface of the end plate 60 that is closer to the bottom surface of the magnet 46. The ball bearing 57 locates the fan mount assembly 53 in the casing 51. FIG. 5E depicts the fan mount assembly 53 as assembled with the fan blades 58 prior to being mounted in the casing 51.

Figure 6A:
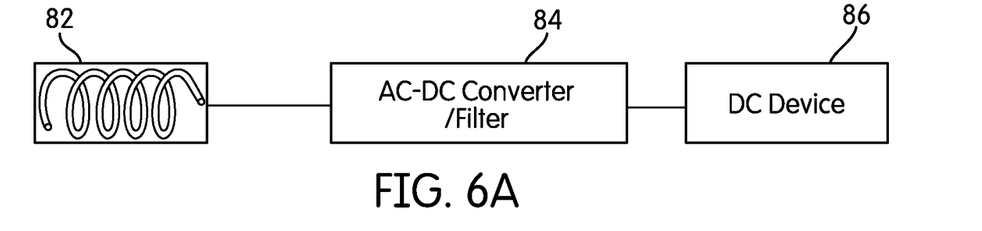
FIG. 6A is a schematic diagram of a system for powering a DC component according to an embodiment.
Figure 6B:
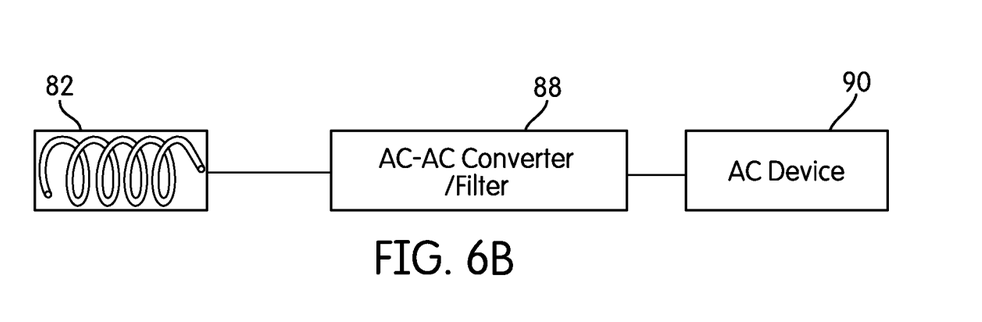
FIG. 6B is a schematic diagram of a system for powering an AC component according to an embodiment.

FIG. 6A is a schematic diagram of a system for powering a DC component according to an embodiment. As shown in FIG. 6A, a solenoid 82 is connected to an AC-DC converter/filter block 84, for example a transformer, a choke coil, a rectifier, a linear power supply, or a switching power supply. The AC-DC converter block 84 is in turn connected to a DC device 86, which may be a fan, another cooling device, or another type of DC device. FIG. 6B is a schematic diagram of a system for powering an AC component according to an embodiment. As shown in FIG. 6B, the solenoid 82 drives an AC device 90, which may be a fan, another cooling device, or another type of AC loads. In some embodiments, the solenoid 82 may be directly connected to the AC load, or connected via a transformer, or an AC-AC converter/filter 88, which in turn is connected to the AC device 90. The AC-AC converter/filter 88 may be used, for example, as required to meet the load or electrical noise requirements.

Referring again to embodiments where the AC or DC device is a fan such as the cooler 50, FIG. 5B depicts an exemplary arrangement. As shown in FIG. 5B, the coolers 50 are arranged with the ATS in a frame and are disposed side by side with each other, and parallel to the ATS. While the embodiment shown in FIG. 5B includes four coolers 50, certain embodiments may include a different number of coolers 50. The quantity and distribution of coolers 50 in a system may differ depending on the sizes of the enclosure and ATS. The coolers 50 are relatively compact and do not substantially increase the overall width of the assembly. Further, the coolers 50 may be made out of components that are not expected to generate eddy currents or interference with existing ATS components. In at least one embodiment, the cooler 50 does not comprise copper, for example.

Moreover, the cooler 50 has relatively few parts, being limited to the magnet 46, the shaft 40, and the blades 42, in at least one embodiment. Additionally, the cost of its components is relatively low, in part due to the small number of components involved. Further, at least because the cooler 50 is "self-exciting," there is no external power requirement, as mentioned above. In addition, the cooler 50 serves both to protect the ATS thermally and to remove humidity from the cabinet and electrical components.

FIG. 5C depicts an enclosure in which the apparatus of FIG. 5B is disposed according to an embodiment. Specifically, an enclosure 56 is a cabinet in which the automatic transfer switch and the cooler are disposed. The enclosure may be of enclosure type 1, type 4X or 3R as defined by National Electrical Manufacturers Association (NEMA) Standards Publication 250-2003. The cooler 50 is configured to generate a convection force within the enclosure. In at least one embodiment, the cooler 50 may achieve temperatures of ATS components within the enclosure 56 that avoids 'de-rating' of the ATS 100. That is, the ATS 100 is kept within temperatures required by industry standards. For example, in at least one embodiment, the temperature may be kept within 65° C. for a line bus of the ATS 100 and 60° C. for a line lug of the ATS 100, according to Underwriters Laboratories Standard 1008, entitled "Transfer Switch Equipment." With the coolers 50, appreciable temperature reductions may be achieved, as discussed further below. In particular, providing four of the coolers 50 with the ATS 100, corresponding to the exemplary arrangement shown in FIG. 4B, is associated with a temperature rise being lowered by at least 10° C.

Figure 7A:
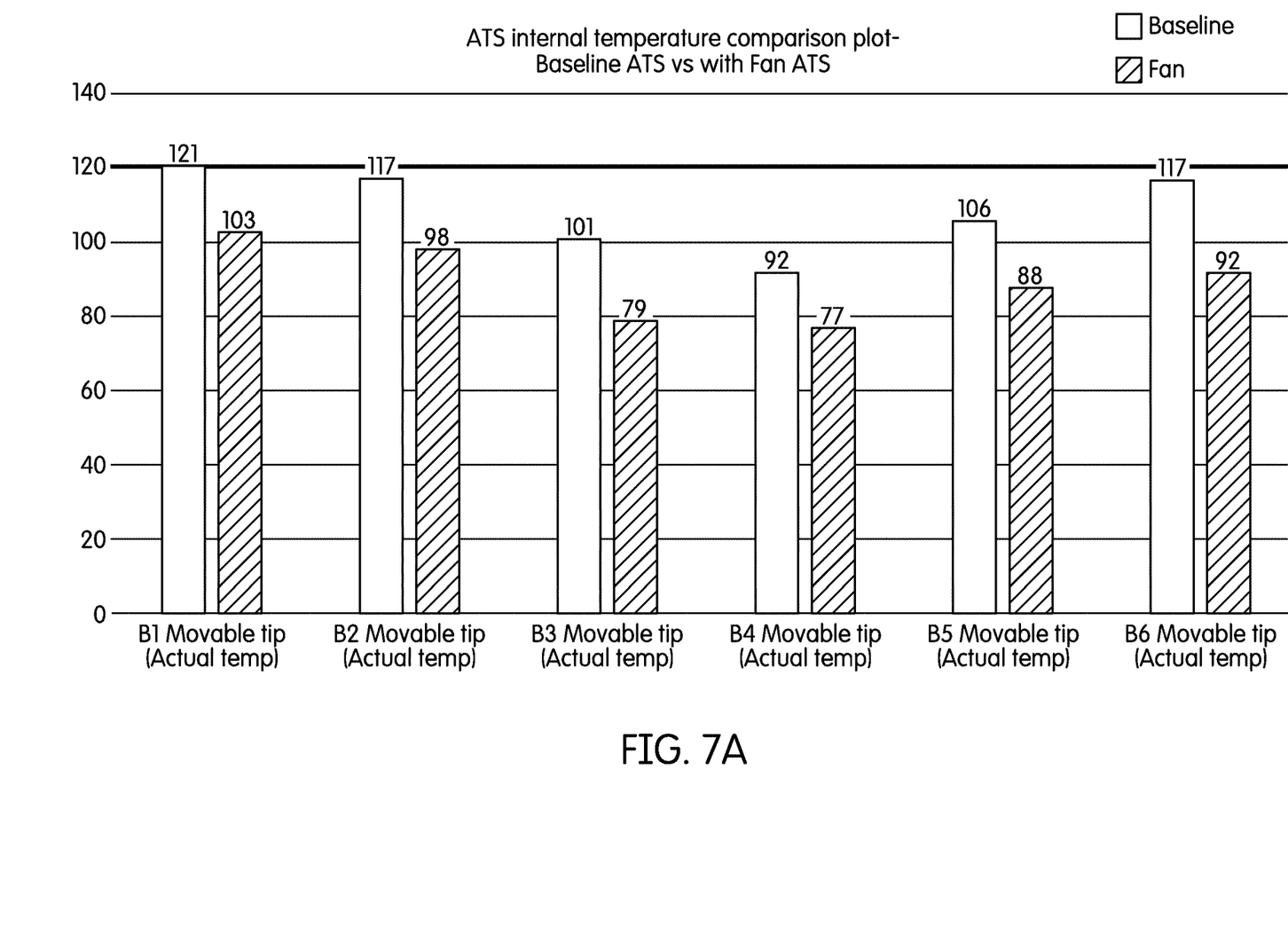
FIG. 7A depicts a plot of temperature measured at a movable tip of at least one ATS device.

FIG. 7A depicts a plot of temperature measured at a movable tip of at least one ATS device. Specifically, FIG. 7A is a temperature plot for the 'finger' of each cassette in a phase cassette sub-assembly (as shown in FIG. 1, for example), on a finger-by-finger basis. The data shown in FIG. 7A represents the measured temperature for each finger of the six cassettes (respectively labeled 1 through 6). In FIG. 7A, temperature data for the movable tips in a cassette sub-assembly of an ATS with cooler 50 is shown on the right, and temperature data for movable tips in a cassette sub-assembly without cooler 50 is shown on the left. The movable tips in the ATS devices equipped with cooler 50 had significantly lower temperatures than their counterparts without cooler 50.

Figure 7B:
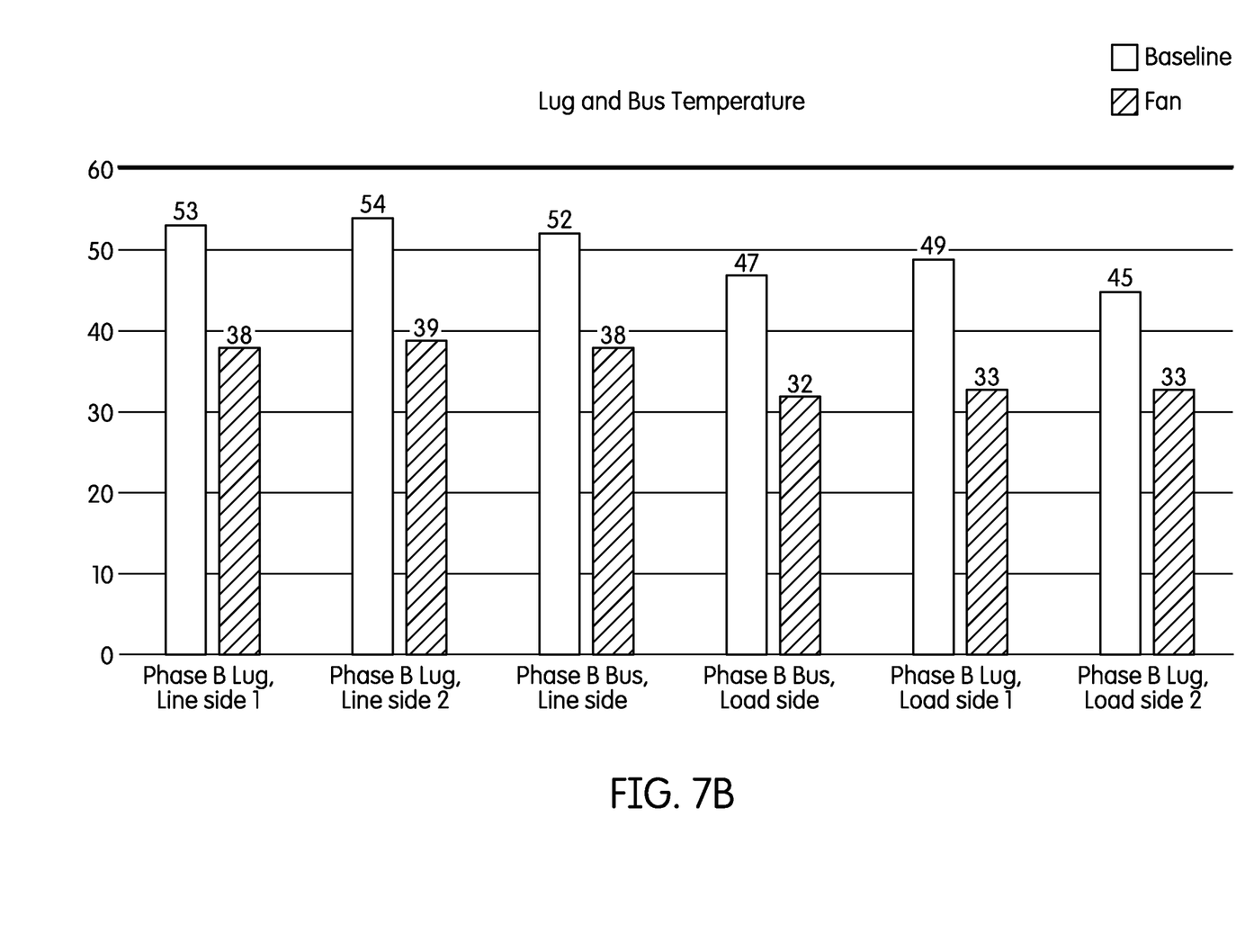
FIG. 7B depicts a plot of temperature measured at the lug and bus of at least one ATS device.

FIG. 7B depicts a plot of temperature measured at the lug and bus of at least one ATS device. In particular, for phase B, the temperatures of a first and second lug line sides and bus line sides were measured, as well as bus and lug load sides. As with the movable tip, the respective lug and bus measurements of ATS 100 indicated that lower temperatures were measured when the coolers 50 were employed, as opposed to not being provided.

Figure 8:
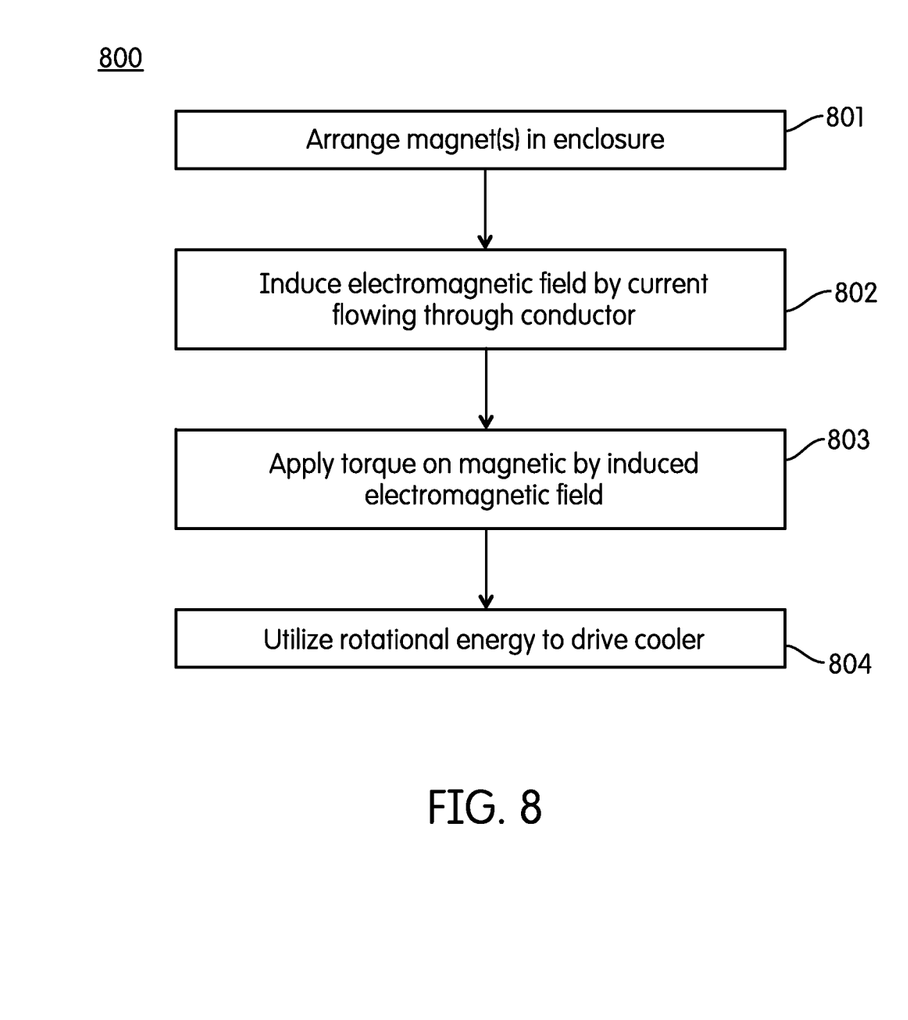
FIG. 8 depicts a process according to an embodiment.

FIG. 8 depicts a method 800 according to an embodiment. The method 800 includes disposing at least an automatic transfer switch and a component, such as a cooler, having one or more permanent magnets, in an enclosure, at step 801. The method further includes inducing an electromagnetic field by the current which flows through at least one conductor in the automatic transfer switch, at step 802. The method still further includes applying a torque on the permanent magnet 46 by the induced electromagnetic field, at step 803. Additionally, the method includes utilizing rotational energy to drive the component, such as the cooler, at step 804.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An assembly, comprising:
   an automatic transfer switch comprising an operating mechanism configured to cause current to flow through the automatic transfer switch; and
   a cooler configured to cool at least a portion of the automatic transfer switch and structured to be wirelessly driven by electromagnetic fields generated in response to current flowing through the automatic transfer switch.

2. The assembly of claim 1, wherein:
   the cooler comprises a drive shaft having a magnet, and a plurality of blades arranged concentrically around the drive shaft at a first end of the drive shaft.

3. The assembly of claim 1, wherein
   the cooler comprises a permanent magnet configured to rotate in response to the electromagnetic fields.

4. The assembly of claim 3, further comprising:
   an enclosure in which the automatic transfer switch and the cooler are disposed,
   wherein the cooler is configured to generate a convection force within the enclosure.

5. The assembly of claim 2, wherein the magnet is disposed closer to the first end of the drive shaft than to a second end.

6. The assembly of claim 1, wherein the cooler lacks a direct electrical connection to an external power supply or the electrical phases of the automatic transfer switch.

7. The assembly of claim 6, wherein the cooler further comprises a housing in which the plurality of blades and the drive shaft are disposed.

8. The assembly of claim 1, wherein the magnet comprises a neodymium magnet.

9. The assembly of claim 1, further comprising:
   a solenoid or transformer configured to convert energy from the electromagnetic fields to electrical energy to operate at least one AC or DC load, including the cooler.

10. The assembly of claim 1, wherein the cooler further comprises a power converter.

11. A system comprising:
    an automatic transfer switch comprising
      a plurality of switch components comprising respective pluralities of cassettes;
      at least one conductor configured to generate a magnetic field in response to current flowing through the conductor;
      a permanent magnet; and
      a driven shaft driven by rotation of the permanent magnet in the magnetic field;
    wherein a polarity of the magnetic field is configured to change in accordance with an alternating current of the automatic transfer switch.

12. The system of claim 11, wherein the permanent magnet is disposed between a base of the driven shaft and at least one blade.

13. The system of claim 11, further comprising a plurality of coolers arranged in parallel.

14. The system of claim 11,
    wherein the at least one conductor is structured to induce an electromagnetic field in which the magnet is disposed.

15. A method comprising:
    disposing at least an automatic transfer switch and a cooler in an enclosure,
    generating a magnetic field by supplying alternating current to at least one conductor in the automatic transfer switch,
    disposing a driving mechanism in the magnetic field, and
    driving the cooler by rotation of the driving mechanism in response to the magnetic field.

16. The method of claim 15, wherein the cooler is unpowered and driven only by the driving mechanism.

17. The method of claim 15, wherein the cooler comprises a plurality of coolers disposed adjacent to each other.

18. The method of claim 15, wherein the automatic transfer switch comprises a loop conductor around which the magnetic field is generated.

19. The method of claim 15, wherein the driving mechanism comprises at least one neodymium magnet.

20. An automatic transfer switch cooling apparatus, comprising:

an automatic transfer switch comprising an operating mechanism configured to cause current to flow through the automatic transfer switch;

an electromagnetic coupling device that is located proximal to a conductor or a transfer switch of the automatic transfer switch, wherein the electromagnetic coupling device is configured to generate electrical power from electromagnetic fields generated by electrical current flowing in the conductor or the transfer switch; and one or more cooling fans coupled to electromagnetic coupling device, wherein the one or more cooling fans are configured to cool at least a portion of the automatic transfer switch and structured to be driven by electrical power from the electromagnetic coupling device generated from electromagnetic fields generated in response to current flowing through the automatic transfer switch.

21. The automatic transfer switch cooling apparatus of claim 20, wherein:

the electromagnetic coupling device is one of a coil, a solenoid or a transformer.

22. The automatic transfer switch cooling apparatus of claim 20, wherein:

the electrical power from the electromagnetic coupling device is conditioned into AC voltage or DC voltage for supply to the one or more cooling fans by one of a choke coil, a transformer, a rectifier, a linear power supply, or a switching power supply.

23. The automatic transfer switch cooling apparatus of claim 20, wherein:

the one or more cooling fans is placed to increase an air flow over one or more selected components.

24. The automatic transfer switch cooling apparatus of claim 20, wherein:

the one or more cooling fans is placed to increase an air flow from an interior space of the automatic transfer switch to an ambient air space exterior to the automatic transfer switch.

* * * * *